United States Patent
Osotio et al.

(10) Patent No.: US 10,776,715 B2
(45) Date of Patent: Sep. 15, 2020

(54) ARTIFICIAL INTELLIGENT COGNITION THRESHOLD

(71) Applicant: Microsoft Technology Licensing, LLC, Redmond, WA (US)

(72) Inventors: Neal T. Osotio, Sammamish, WA (US); Angela L. Moulden, Ravensdale, WA (US); Michael David Ream, Issaquah, WA (US); Michelle R. Crosslin-Webb, Auburn, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 743 days.

(21) Appl. No.: 15/582,062

(22) Filed: Apr. 28, 2017

(65) Prior Publication Data

US 2018/0314980 A1 Nov. 1, 2018

(51) Int. Cl.
   *G06N 20/00*     (2019.01)
   *G06F 9/451*     (2018.01)
   (Continued)

(52) U.S. Cl.
   CPC ............. *G06N 20/00* (2019.01); *G06F 3/048* (2013.01); *G06F 9/451* (2018.02); *G06F 8/38* (2013.01);
   (Continued)

(58) Field of Classification Search
   CPC ...... G06F 9/451; G06F 9/44505; G06F 3/048; G06F 2201/81; G06F 11/34;
   (Continued)

(56) References Cited

U.S. PATENT DOCUMENTS

| 6,039,575 A | 3/2000 | L'Allier et al. |
| 6,606,480 B1 | 8/2003 | L'Allier et al. |

(Continued)

FOREIGN PATENT DOCUMENTS

| CN | 103793796 A | 5/2014 |
| WO | 2016154543 A1 | 9/2016 |

OTHER PUBLICATIONS

Brostoff, Sacha, et al. "Transparent interaction; dynamic generation: context histories for shared science." 2005, pp. 1-5. (Year: 2005).*

(Continued)

*Primary Examiner* — Kamran Afshar
*Assistant Examiner* — Randall K. Baldwin
(74) *Attorney, Agent, or Firm* — Medley, Behrens & Lewis, LLC

(57) ABSTRACT

Representative embodiments disclose mechanisms for dynamically adjusting the user interface and/or behavior of an application to accommodate continuous and unobtrusive learning. As a user gains proficiency in an application, the learning cues and other changes to the application can be reduced. As a user loses proficiency, the learning cues and other changes can be increased. User emotional state and openness to learning can also be used to increase and/or decrease learning cues and changes in real time. The system creates multiple learning models that account for user characteristics such as learning style, type of user, and so forth and uses collected data to find the best match. The selected learning model can be further customized to a single user. The model can also be tuned based on user interaction and other data. Collected data can also be used to adjust the base learning models.

16 Claims, 6 Drawing Sheets

(51) Int. Cl.
*G06F 3/048* (2013.01)
*G06F 9/445* (2018.01)
*G06F 8/38* (2018.01)
*G06F 11/34* (2006.01)

(52) U.S. Cl.
CPC ...... *G06F 9/44505* (2013.01); *G06F 11/3438* (2013.01); *G06F 2201/81* (2013.01)

(58) Field of Classification Search
CPC .............. G06F 11/341; G06F 11/3438; G06F 11/3452; G06N 20/00; G06N 99/00; G06N 99/005
See application file for complete search history.

(56) References Cited

U.S. PATENT DOCUMENTS

| | | | | |
|---|---|---|---|---|
| 7,620,894 | B1* | 11/2009 | Kahn | G06F 3/0481 715/707 |
| 7,739,595 | B2 | 6/2010 | Salter | |
| 8,732,662 | B1* | 5/2014 | Savant | G06F 9/451 717/120 |
| 8,775,332 | B1* | 7/2014 | Morris | G06N 20/00 706/11 |
| 8,806,444 | B1 | 8/2014 | Podgorny et al. | |
| 9,299,265 | B2 | 3/2016 | Kellman | |
| 2002/0083025 | A1* | 6/2002 | Robarts | G06F 1/163 706/12 |
| 2002/0142278 | A1 | 10/2002 | Whitehurst et al. | |
| 2006/0190822 | A1 | 8/2006 | Basson et al. | |
| 2007/0190503 | A1 | 8/2007 | Yeramyan et al. | |
| 2010/0190143 | A1 | 7/2010 | Gal et al. | |
| 2013/0159228 | A1* | 6/2013 | Meijer | G06F 21/316 706/14 |
| 2014/0101611 | A1* | 4/2014 | Lang | G06F 21/32 715/813 |
| 2014/0278051 | A1* | 9/2014 | McGavran | G01C 21/3484 701/400 |
| 2015/0268819 | A1* | 9/2015 | Smoak | G06F 3/0482 715/768 |
| 2016/0349938 | A1* | 12/2016 | Sharon | H04L 67/22 |
| 2018/0025287 | A1* | 1/2018 | Mathew | G06N 5/04 706/12 |

OTHER PUBLICATIONS

Shankar, Anil, et al. "User-context for adaptive user interfaces." Proceedings of the 12th international conference on Intelligent user interfaces. 2007, pp. 321-324 (Year: 2007).*

Jain, Rahul, Joy Bose, and Tasleem Arif. "Contextual adaptive user interface for Android devices." 2013 Annual IEEE India Conference (INDICON). IEEE, 2013. (Year: 2013).*

Chalfoun, et al., "Subliminal Cues While Teaching: HCI Technique for Enhanced Learning", In Journal of Advances in Human-Computer Interaction, Jan. 2011, pp. 1-16.

"International Search Report and Written Opinion Issued in PCT Application No. PCT/US2018/028216", dated Jul. 16, 2018, 15 Pages.

* cited by examiner

ARTIFICIAL INTELLIGENT COGNITION THRESHOLD

FIELD

This application relates generally to the field of artificial intelligence and machine learning. More specifically, the disclosure herein applies machine learning to identify a learning model for a user and adjust operation of an application based on the learning model and user interactions.

BACKGROUND

Current applications are created with a generally fixed mechanism of interacting with a user. In many instances, companies utilize design specialists, focus groups, and other testing methods to create and design a user interface (UI) that attempts to provide a consistent, easy way for a user to interact with the application and access its functionality. Depending on the user, this can result in a longer or shorter learning curve for users to become proficient in understanding how to use the UI to access desired functionality. In many instances, users only learn enough about a particular application to actually perform their desired tasks and the program may be capable of much more than the user utilizes. Many users are either unaware of or unable to access all the capability provided by a program.

As a user's proficiency increases, the UI tends to remain relatively static, although some applications allow a user to customize the user interface such as by rearranging UI elements, adding and/or removing UI elements, and so forth. However, the basic manner in which the application operates remains static.

It is within this context that the present embodiments arise.

DETAILED DESCRIPTION

Figure 1:
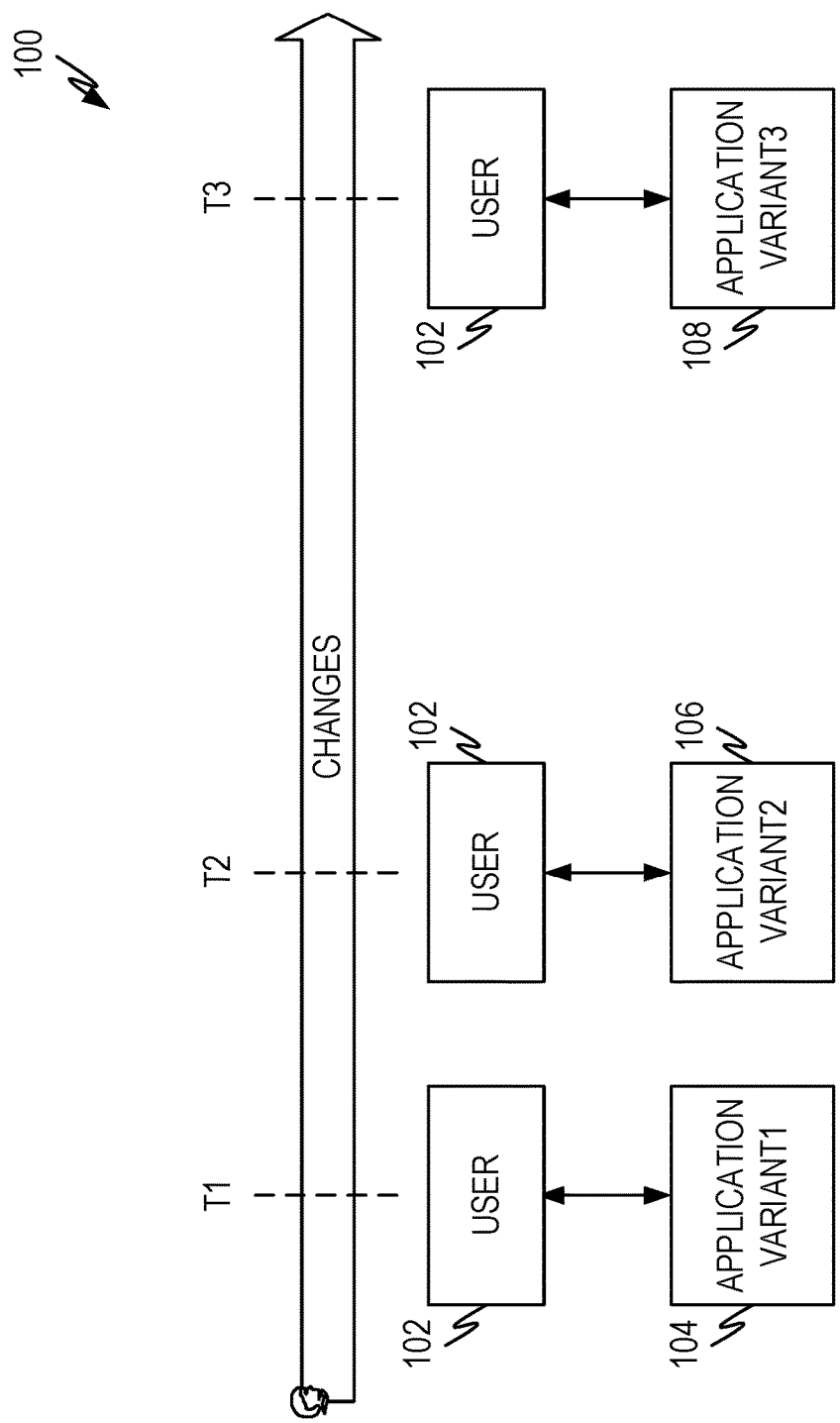
FIG. 1 illustrates an example of changes over time for an application.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

Embodiments of the present disclosure target the problems that occur when a user's proficiency either increases or decreases with an application. In the context of this disclosure, an application can be an application running on a device such as a mobile device, a tablet device, a laptop computer, desktop computer, virtual reality system, augmented reality system, and so forth. In addition, an application will also be used to refer to special purpose devices, such as a navigation (e.g., GPS) device, an appliance, a digital assistant, and so forth. Many of these special purpose devices have user interfaces and/or mechanisms of operation and/or interaction with a user that can benefit from the disclosure herein. All of these will be referred to as an application in this disclosure.

The disclosure describes systems, methods, and so forth that include an artificially intelligent (AI) algorithm/skill that dynamically adjusts operation of an application to adjust to the user. In one aspect this can adjust the application to account for increased and/or decreased proficiency. This allows the application to dynamically adjust to the user in a way that is seamless and fluid and results in a more natural interaction between the user and the application.

In another aspect, the AI algorithm can adjust operation of the application to raise the user's proficiency and/or teach a user in such a way that the user learns in a fluid and subtle experience based on the interaction, conversation and context between the user and the AI personification. Essentially, the user can be taught in a way that they are learning without them ever knowing they are learning.

As a first set of examples, many companies are going to rapid development cycles where updated versions of applications distributed over the web are released multiple times in a year. If UI aspects and/or functionality change with these releases, a user's proficiency with an application may be lowered with every release. In such a situation, the application can change UI and/or behavior to help a user become more proficient in operating the new releases. Similarly, in situations where a user's proficiency increases with a given application, the application can change UI and/or behavior to take advantage of a user's increased proficiency.

Other factors also affect a user's interaction with a given application. For example, a user's emotional state may affect how a user may prefer to interact with an application. Thus, when a user is stressed and/or upset, a user may prefer to interact with an application in a streamlined manner without the application "being in the way" or "attempting to teach anything." Thus, the user may prefer a well-known environment with minimal clutter and/or minimal interaction. The disclosure can account for a user's emotional state when identifying how to modify an application and how to interact with the user.

The system can collect information from a wide variety sources, including one or more user profiles, information from a search system (past searches, user preferences, user interests, etc.), sensors (heart rate, blood pressure, motion, environmental, etc.), user interaction data from the application, user interaction history, and so forth. The system can then identify insights, such as emotional insights and/or other insights. Based on some or all this information, the system can identify a learning model for the user. The learning model can be based on a specific user learning profile derived for this data.

The learning model along with other information is used by the system to identify changes in the UI and/or behavior of the application that should be made. UI changes can include layers of data, learning cues, and so forth. Behavior adjustments can change the way the application functions, when certain user interface elements are presented and a wide variety of other changes. In a scenario where the user is more proficient, the user interface and/or behavior can be streamlined to eliminate unnecessary interactions. In a scenario where the user is less proficient, the user interface can be adjusted to take the user from their current level of proficiency to a higher level of proficiency. The learning model and individual learning threshold for the user can be used to create an environment that matches the user's learning style and ability to learn, given the user's current emotional state, intellectual state, and so forth.

Information collected from the user's interaction with the system after the learning model is used to adjust the UI and/or behavior of the application, can be used to both fine tune the learning model for the user as well as make adjustments for the general learning model that forms the basis for the user's learning model. For example, if the learning model determines that the user will be receptive to a learning mode to help the user increase proficiency based on the collected data and sets the UI and/or behavior accordingly, the system can monitor explicit and/or implicit feedback from the user about how the user is responding to the adjustments. This feedback is then used to make further adjustments to fine tune the user's experience as well as make adjustments to the underlying learning model(s). As an example, if the learning model determines a user is receptive to learning and sets the UI and/or behavior accordingly. Subsequently, the learning model determines that the user is not responding well to the UI and/or behavior by monitoring the user's biometrics, the way the user is interacting with the application, and other such data. Based on this determination, the system alters the UI and/or behavior to adjust the current user experience. In addition, the system may determine that the underlying learning model should be adjusted so that in the future, the learning model will behave differently to the original input.

Description

FIG. 1 illustrates an example 100 of changes over time for an application. In this example, a first variant of an application 104 exists at time T1. This can be a version of the application 104. A user 102 interactions with the application 104 and, over time, gains proficiency with the application. At a later date, time T2, the application is updated and/or changed to a second variant 106. This can be a different version of the application 104. The user's 102 proficiency with the new version of the application 106 drops due to differences in UI, or behavior, or both.

As explained below, the system can collect and/or use a variety of information to identify a learning model for the user. Once a learning model is selected, the learning model can monitor, collect, and/or use information to modify the UI and/or behavior of the new version 106. For example, the learning model can ascertain the user's proficiency with the new version 106 by comparing information such as dwell time on tasks, time spent hunting on how to perform a task, and so forth to similar information by the user from the prior version 104. Furthermore, emotional state information (ex- plained below) and other information can also be used to identify how currently receptive the user might be to helping the user get to a higher level of proficiency. Based on this information the system can identify whether and how to modify the UI and/or behavior of the application.

As a representative example, consider an application provided as a service where the service provider updates the application on a regular basis, such as might happen in the short development cycles often used by service providers. Sometimes such applications are accessed through a local client, such as a web browser or specialized service client, and sometimes such applications can be downloaded and executed locally. Sometimes a combination is utilized. In this example, as the service provider moved from the prior version 104 to the current version 106, changes were made to both the user interface and to the behavior of the application.

Continuing the example, the system identifies a learning model for the user that matches the particular learning style of the user (discussed below) and the user's situation. For example, if the user is an information worker and has a visual learning style, the system can identify a best fit available learning models for the user based on user profile information, prior collected information and so forth. Also, suppose that the system also knows from past experience with the user that the user tends to dislike trying new things and usually waits as long as possible before upgrading from one version of an application to another. The learning model can utilize the combination of a visual learner and a dislike for changed applications to ascertain that the user would prefer to work in a familiar environment.

Suppose the emotional state of the user indicates to the learning model that the user might be open to help in making the transition from the prior version 104 to the current version 106. In this situation, the learning model can set a learning threshold for the user that includes identifies appropriate learning cues and other interactive helps (since the user is a visual learner) for the user. These learning cues and interactive helps can be rendered as one or more layers on top of the application user interface as described below. Additionally, or alternatively, if the underlying application is learning model aware, the system may interact directly with the application to change its UI.

The modified UI is presented to the user and the system monitors the user and user interactions as previously described. For example, the system can collect/monitor one or more of:

task dwell time (i.e., how long user spends attempting to perform a task);
command search behavior (i.e., how long a user spends looking for controls/commands to perform a task, number of menus checked for commands, etc.);
help system searches (i.e., number of times the user searches for help to show how to complete a task, content of those searches, etc.);
biometric data (heart rate, temperature, blood pressure, etc.);
system interaction data (how hard the user hits the keyboard, quickness of interaction, force of touches, tone of voice interactions, word choice, etc.); and
other similar information.

By collecting, monitoring, and/or accessing such information, the system can identify how successful the presented learning cues and UI changes are in helping the user 102 interact with the new version 106. If the system identifies the user is staying calm even though the other data indicates that the user 102 is less proficient at the new version 106 than the old version 104, then the system can conclude that the user is satisfied with the changes that have been made and can continue them and/or fine tune them to attempt to become even more helpful. Fine tuning may include setting the learning threshold to a level that provides even more information to lead the user to new levels of proficiency.

On the other hand, if the system detects that the user is becoming increasingly frustrated, angry or otherwise ascertains that the learning threshold is not compatible with the user's 102 wishes, the system can adjust the learning threshold. For example, the system may render on one or more layers a user interface that looks more like the prior version 104 user interface to put the user into a more familiar environment.

In a situation where the UI is changed by one or more layers, the system can act as an intermediary between the application and the user. In other words, user interactions can be intercepted and translated into interactions accepted by the underlying application (i.e., the new version 106). For example, if commands have moved from one location to another in the new version 106, the layer can render the commands in the location(s) of the prior version 104 and when the user interacts with the changed UI, issue an appropriate event to the underlying application.

In a situation where behavior changes, the system can render an appropriate UI from the prior version 104 and, as the user interacts with the rendered prior version UI, collect the information needed to then translate the commands and/or interactions made by the user 102 into those expected by the underlying new version 106. Thus, the learning model and system can be tailored not only to the user, but also to the particular changes between versions (i.e., 104 and 106) so that the system knows how to translate user interactions against a modified UI into interactions that will allow the new version 106 to accomplish the task desired by a user. Those skilled in the art can create the translations and/or mappings needed to map the UI and/or behavior of different versions of the application and the system can then utilize the translations and/or mappings to render the UI and to translate user interactions as described.

In addition to, or in lieu of, adjusting the UI and/or translating user interactions as described, the learning model can adjust the behavior of applications. In some instances, applications can be learning model aware or otherwise expose functionality that allows the application to receive information regarding how behavior of the application should be adjusted to accommodate changing user proficiency and/or user wishes. In some instances, the application can adjust its own behavior based on input from the user and/or other data as previously described. When the application adjusts its own behavior, it can incorporate a learning model or aspects of a learning model. In other instances, the application can receive input from a separate learning model. In still other instances, combinations thereof can be utilized.

Thus, the learning model and learning threshold can dynamically adjust to a user's changing moods, wishes, and so forth to modify the UI and/or behavior of the application.

If the service provider and/or company releases yet another change, such as application variant 3 108, the learning model can take into account not only proficiency with the prior version (i.e., application variant 2 106) but also the version prior to that (i.e., application variant 1 104). Thus, the learning model can be configured to account for a variable length history and/or multiple proficiency levels across multiple versions of an application.

Figure 2:
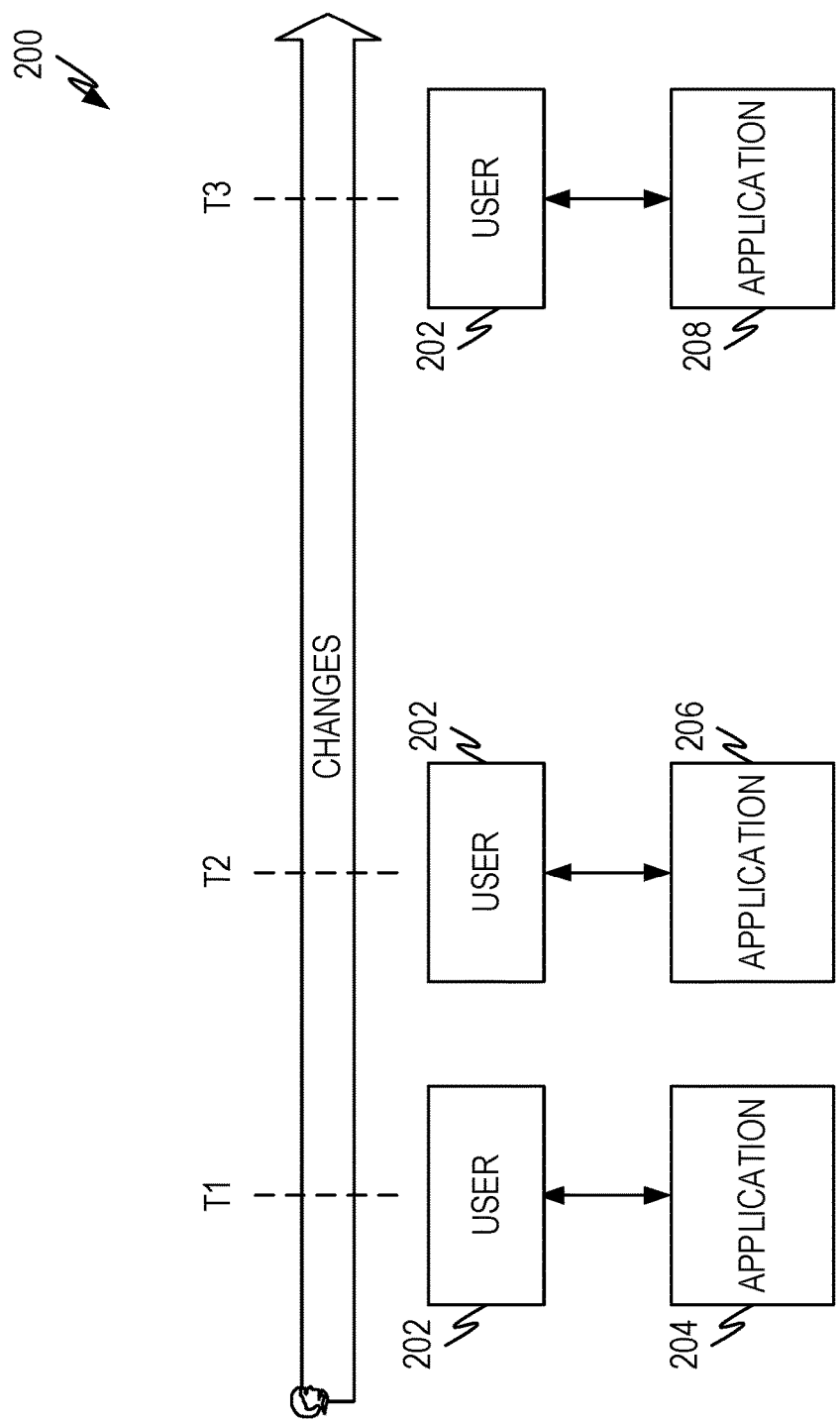
FIG. 2 illustrates an example of changes over time for a user.

FIG. 2 illustrates an example 200 of changes over time for a user 202. In this example, the user's proficiency changes over time, while the variant of the application remains constant. Thus, at time T1 the user may have a low level of proficiency with the application 204 that increases at time T2 and again at time T3. As the user's proficiency increases, the learning model can adjust the learning threshold to modify the application 206, 208 UI and/or behavior to account for the change in proficiency.

In addition to changes in proficiency level, the system can also account for the emotional state of the user and environmental factors.

As one representative example where an application adjusts to the user (changes in proficiency level, emotional state, and/or environmental factors) consider an application that issues Global Positioning System (GPS) directions (e.g., turn by turn directions). Typically, GPS units, GPS applications, and/or digital assistants (all covered under the definition of application herein) issue the user simple directions as they need them. For purposes of this example, all these will be referred to as "the GPS." For example, as the GPS detects a user is approaching a corner, the GPS may issue the direction "turn left in 100 yards at next street." As the user arrives at the corner, the GPS may issue the direction "turn left now." Such directions are easy to follow, but they fail to place the directions in a larger context or help the user identify and/or memorize landmarks to help them learn the route. Thus, if a route is complicated and the user relies on the GPS turn by turn directions, the user is not likely to learn the route, even if the route is repeated. Thus, the user becomes reliant on the GPS for all trips.

As a slight variation, users typically know the area around where they commonly travel, with areas less frequently traveled being less familiar. Thus, when traveling a route that crosses both familiar and unfamiliar territory, the GPS directions are unnecessarily detailed for the familiar territory and perhaps either appropriate or perhaps also overly or insufficiently detailed for the unfamiliar territory, depending on the level of familiarity.

The learning model can help assess the level of familiarity with the area, such as by evaluating: the user's past travel locations; frequency of travel to a location, an area, etc.; frequency that a user has passed a landmark, location, etc.; and other similar data. How often a user requests directions to a location can also indicate a level of familiarity. In this context a low level of familiarity may mean that a user would prefer more detailed directions, while a high level of familiarity may mean that a user would only need general directions to a location, landmark, and so forth. Furthermore, associating a level of familiarity with a region, area, location, landmark and so forth, can allow the learning model to place the directions in context to help the user learn an unfamiliar region rather than simply giving the same level of detailed directions in all instances.

Continuing with the example, suppose a user is familiar with the local area where a route starts but less familiar with the precise location at the end of the route and the region surrounding. The learning model and/or GPS (depending on the particular implementation) may begin with general navigation directions: "Proceed to I90 and head west toward Seattle." To a user familiar with their local region, this direction is sufficient to get the user headed in the right direction and toward the less familiar region. Additionally, or alternatively, the GPS may place the directions in a larger context to help teach the user the route. For example:

"To get to the Key Arena we will travel west on I90 toward Seattle and merge onto 15 north. Then we will turn on one of the main Seattle streets such as Mercer or Denny. I'll give you more detailed instructions once we get close to where you need to turn."

Along the way, the GPS can add detail and/or call out visual landmarks, which could be different in daytime and in nighttime, that the user might notice or use if they were proceeding from memory. For example, the GPS can let the user know "the next street will be Denny Way" or "Denny Way will take you by the Space Needle". If the GPS detects that the user is getting frustrated or not responding well, the learning level can be adjusted. For example, if the user prefers the system to be less chatty (due to anger, frustration, conversations in the car, or other factors), the learning level can be adjusted to give fewer contextual insights and more detailed instructions, if needed. The system can monitor user biometrics to gauge user reaction to the learning cues. The system can also monitor environmental sensors to detect, for example, user conversation with others in the car and dial back the learning cues so as not to interrupt the user conversation.

As a variation of the example, the user can start the GPS with an indication of the destination desired by the user. The GPS can then monitor the user's direction and remain silent (not issuing detailed commands) unless the GPS determines the user is not on track to arrive at the destination, at which time the GPS can step in and direct the user back on route. Thus, the GPS ascertains a level of proficiency and if the level of proficiency is high enough, the system monitors the user and only offers help and/or guidance if the GPS predicts an unsuccessful result (i.e., the user is off route or will have trouble arriving at the desired destination if they continue on the route they are on).

GPS systems calculate a route based on various factors, such as the route that will get the user to the destination the quickest, avoid undesirable features (typically specified by settings and can include such features as toll roads, freeways, etc.), route around traffic, construction, or other undesirable events/conditions, and so forth. To determine when to step in the GPS can calculate a route based on such features, and then inform the user the impact of deviations from that route. For example, if the user will encounter traffic if she continues along the current route, the GPS can inform the user of such an event.

Similarly, the GPS can be recalculating routes in the background that will enable the user to arrive at the destination and score each route based on criteria (e.g., time to destination, type of road traveled, undesirable events/conditions such as traffic/construction, undesirable features, and so forth) and offer help when the currently predicted route (i.e., the route the user is most likely to take given current location, past routes of travel, etc.) score transgresses a threshold. Thus, each criterion for a given route can be given a corresponding score ranging from a low value to a high value and the aggregate score calculated. Score aggregation can be calculated as a sum, weighted sum of the individual criteria scores. Other operations such as normalization of the aggregate score can be performed if desired. This total score can then be compared to a threshold and when the score exceeds (or drops below, depending on how the scores are set up) the threshold, the system can step in to offer help, inform the user of the consequences of continuing on the route, and so forth.

In addition, or in the alternative, the GPS can monitor for specific things along the way and offer help. For example, making sure the user is in the correct lane, or knows of an upcoming street if the user doesn't appear to be making a needed lane change or slowing for the turn. As a further variation, the GPS can monitor a distraction level and/or proficiency level (i.e., familiarity level) for an area of the user and step in when the user may be distracted or not familiar enough to notice a correction, lane change, turn, etc. is required. For example, if a user is conversing with a passenger or is unfamiliar with an area.

As another aspect, the application (e.g., GPS) can tailor UI and/or behavior based on the user's stated or inferred preferences and/or learning mode. As discussed below, some users are spatial and/or visual learners. Others are aural/oral learners. Still others are observe and do learners or other style of learning. Learning can be reinforced in an appropriate manner when the user has down time, such as being stuck in traffic. For example, the application can use question/answer in an appropriate format (audible, touch screen, etc.) to reinforce learning. The frequency and/or timing can also be specified by the user and/or determined implicitly based on input data as described herein.

All of these can also be adjusted by the user's emotional state, for example, not asking questions or being too chatty when the user would be annoyed by such due to their present emotional state.

These are examples of ways that the learning model can set a learning level which unobtrusively helps a user to learn. These are also examples of how the system can be adjusted to account for user familiarity and/or proficiency with both the application and with other aspects that are outside the application, but influence how the system interacts with a user.

In the above example, several aspects of embodiments of the disclosure are evident. For example, as the system detects a certain level of proficiency, it can provide a different level of assistance. Thus, once the system determines that the user has achieved a level of proficiency in a task (including following a route or familiarity with an area), the system can monitor the user's behavior, emotional state, proficiency, progress toward completion of a desired task, and so forth and offer help when it appears that such would be helpful and/or timely. Although the above example uses a GPS as the example application, the principles apply to any application. Thus, for example, as a user becomes more proficient at a given task (creating a report, formatting a document, touching up a photo, or any other type of task), the system can adjust the user interface or behavior or both to accommodate the changes in proficiency.

Another aspect that is evident is that the system can adjust to different learning styles. Thus, for people who are primarily visual learners, the system can present visual learning cues. For people who are primarily auditory learners, the system can present audible learning cues, and so forth.

Figure 3:
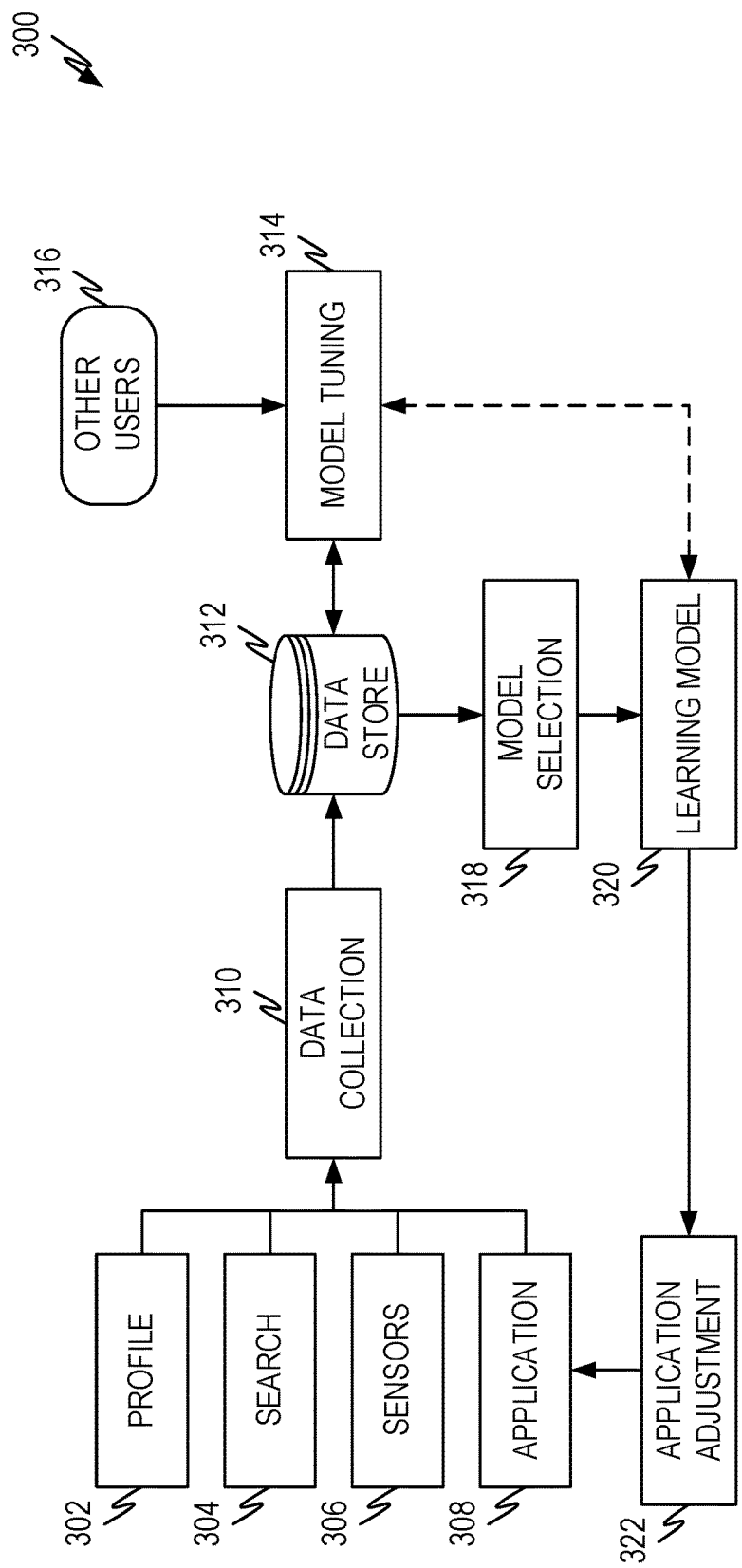
FIG. 3 illustrates an example architecture for dynamic adaptation of an application through a customized learning model according to aspects of the present disclosure.

FIG. 3 illustrates an example architecture 300 for dynamic adaptation of an application through a customized learning model according to aspects of the present disclosure. The system collects data from a variety of sources. Thus, in some embodiments, the system collects information from one or more of profile information 302, search history and other such information 304, sensor information 306, and application 308 information. These can be collected by a data collection process 310 which can be centralized or distributed among the various sources. The data collection process 310 can place the information into one or more data stores 312. Additionally, or alternatively, the data sources can store their information in their own data stores and the system can access the information in the individual data stores.

Profile information 302 can comprise any information provided by a user. This can include some more traditional profile information such as name, occupation, contact information and so forth. This information can also include information directed specifically to the learning model and learning algorithms. For example, the system can provide the user notice of the learning algorithm and ability to modify the UI and/or behavior of an application and get the user's consent to utilize the user's information to provide the learning experience. As another example, the system can ask for parameters such as which learning style the user would prefer to have (visual, aural, verbal, physical, and so forth). The system can also allow the user to turn on and off various features or aspects, such as providing certain types of user overlays, set how often the system inserts itself, set thresholds for parameters such as when the learning system will make adjustments, provide information, and so forth. The system may allow the user to self-specify the level of proficiency in a particular environment and numerous other similar parameters that are used to tune how the learning system and learning algorithm behaves toward the user.

Search history and other similar data 304 can provide information about user interests, habits, and other information that can be useful to the learning model to make adjustments about how things are presented, the metaphors utilized to present information and so forth. Examples below show how this information is used in some embodiments.

Sensor data 306 includes information about the user and/or user's environment. For example, biometric data (such as heart rate, respiratory rate, blood pressure, and so forth), eye tracking, sentence or word speed, word choice (such as words that indicate a particular mood, imperatives vs. questions, short vs. long words), force with which keys are struck and/or touch gestures received, input timing, speech volume, voice inflection, and other such information can provide information about the user's emotional state, physical state, and/or cognitive ability in the given moment and/or context to act on the instructions/service that is provided by the application. Environmental sensors such as sound, temperature, lighting and so forth can also provide information about the user's emotional state, physical state, cognitive ability, and/or the environment of a user (e.g., whether the user can focus on system interactions, has some level of distraction due to conversations with another individual, and so forth).

Application 308 data can provide information about how a user is interacting with the application. Thus, information such as hit rate of the application (how often the user utilizes the application), churn rate (how much of the UI in the application is touched/utilized and the time between touches/utilization), time on task, how often help is searched, and other such data provides information about familiarity with the application, familiarity with how to accomplish a task in/using the application, the user's emotional state, and so forth.

All this data can be made available to the system via one or more data stores 312. The data can be placed on the one or more data stores 312 either by a data collector 310 or by accessing the data in underlying data stores associated with the individual data (302, 304, 306, 308) or a combination thereof.

The data is used to select a learning model as illustrated in model selection process 318. The learning models can be stored in the same data store 312 or a different data store. The collected data allows the system to identify characteristics of a user and based on these characteristics, select a learning model for the user. The learning models are developed using a machine learning process. Representative machine learning processes that can be used to derive a learning model include, but are not limited to, a support vector machine (SVM) technique, a convolutional neural network, a deep neural network, decision tree process, k nearest neighbor process, kernel density estimation, K-means clustering, expectation maximization, and so forth. The machine learning processes take as input the data collected for a user (e.g., such as some or all of the information described above) and produces a model that will give a learning threshold based on the input data. In the context of this disclosure a learning threshold is a parameter that tells the system what to adjust on the application and how much to adjust the application. The learning threshold, for example, can be a number that runs from a minimum to maximum value that indicates what and how much to adjust an application, either by itself or when combined with other information.

The learning models can be established with a basic set of training data and tuned over time by a model tuning process 314 as described below.

The model selection process 318 utilizes characteristics of the user to retrieve the best match for the individual. To perform this match, the system can extract a subset of characteristics that define the learning model from the data collected about the user. In one embodiment, the subset comprises one or more of: 1) learning style; 2) user role; and 3) application, 4) other characteristics.

Learning style can be utilized when selecting a learning model. There are several different frameworks for learning styles in users. These different frameworks break learning styles down into different categories. Not all learning styles in all frameworks are easily represented in a digital learning model. Thus, the framework chosen can reflect the types of learning styles that can be accommodated through modification of the UI and/or behavior of the application. In a representative example, one or more of the learning styles of: visual/spatial, aural/auditory, verbal/linguistic, physical/kinesthetic, logical/mathematical, social/interpersonal, and/or solitary/intrapersonal styles are utilized. Which styles are included may depend on the type of system. For example, an application utilizing a virtual reality or augmented reality system may be more suited to a physical/kinesthetic learning style than an application utilizing a hands-free device (such as in a vehicle) where the system is limited to voice/auditory input and output. Thus, the selected learning style can be based on a hierarchy of user preferences rather than a single selection by a user in some embodiments.

User role is another characteristic that can be utilized when selecting a learning model. User roles relate to one or more of: the type of job a user performs, the type of industry the user is in, the type of tasks a user performs, and so forth. Thus, a user might be a student or a university student or an engineering candidate at a university, and so forth. A user can be an information worker, an information worker in the banking industry, a book keeper and so forth. A user can be a gamer, a player of a particular game, a casual gamer and so forth. Numerous other examples can be provided, but these examples are sufficient to illustrate the principle of user role. As seen in these examples, user role can be broad or narrow, can be more or less detailed, and can be tied to characteristics of a user and/or tasks the user is performing. A taxonomy of user roles can be created so that the characteristics of a user and/or tasks the user is performing can be utilized to retrieve a standardized user role which can then be utilized as input in the model selection process.

The application being utilized can be linked to a particular learning model. Thus, the learning model can be tailored to how the application is adjusted. As described herein, applications that are learning model aware may be adjusted in a different way than applications that are not learning model aware.

The subset of characteristics used by the model selection process 318 can be used to select the closest match for the user. In a representative example, the matching process can take a vector of characteristics as an input and use the vector to match the learning model. In a representative example a search platform such as Google® or Bing® can be utilized to match the subset of characteristics to a learning model.

In addition to a learning model, the model selection process 318, or another process, can be used to retrieve information that can customize the learning model. For example, productivity and/or entertainment data can be retrieved that will customize the learning model such as presented in the examples herein.

The learning model 320 sets the learning threshold based on some of or all of the collected data stored in data store 312. As previously described, the learning model can utilize one or more of learning type, previous engagements (e.g., previous experience with this user), user emotional state, and/or other data to identify a learning threshold that can be translated into UI and/or behavioral changes for the application 308. The learning model can also be customized for a user by how things are presented, the metaphors utilized to present information and so forth.

The learning threshold is used to adjust the UI and/or behavior of the application by application adjustment process 322. In one aspect, as described herein, the UI can be adjusted by rendering the UI in layers and adding, changing, and/or removing different UI aspects of the application. This process is described in greater detail in conjunction with FIG. 5 below. When rendering the UI different learning cues can be placed in the UI and thus can be part of the adjusted UI and/or behavior. Additionally, or alternatively, as discussed in this disclosure, user interactions with the adjusted UI can be translated to input that the application expects to receive to accomplish a given task. How this is accomplished (i.e., by translating behavior, by adjusting the behavior of the application directly, or both) depends on the functionality of the application and whether it is learning model aware or otherwise allows external input to adjust the behavior of the application.

As the user interacts with the application (e.g., the learning cues, modified UI, modified behavior, etc.), the user interactions as well as other data can be used to dynamically adjust the UI and/or behavior (including seamlessly increasing and/or decreasing the learning cues) of the application. This process is discussed in greater detail in conjunction with FIG. 4 below.

User interactions can also be used to tune the overall model, such as by model tuning process 314. The model tuning process 314 is a process that adjusts the learning model to more completely match user expectations, enhance the user experience, and so forth. For example, in the GPS example presented previously, what type of cues given to the user (i.e., whether the GPS points out landmarks, is more "chatty" or more "quiet", and so forth) can be based on the learning model selected to match the user characteristics as described above. However, if the operation does not match the user's desires, the user interactions can indicate that an adjustment to the model is necessary to bring operation of the GPS in line with what the user wants. For example, if the user mutes the GPS, it is a very good indication that the GPS is being too "chatty" for the user. Thus, the current data that describes the user, environment, and so forth can be noted and the learning model adjusted to bring operation of the GPS more in line with what the user wants. These adjustments or "tuning" can be captured along one or more dimensions (e.g., on a per user, per user type, per product, etc. basis). Thus, the model tuning process 314 can also receive information from other users 316. In this way, patterns that describe types of users, products, etc. can be captured and will help tune the learning models in a way that makes them behave in a way that is more desired by the user(s).

Tuning the model is adjusting the training of the models. The model utilized has a set of inputs (e.g., the current data) and a desired output (e.g., different adjustments to the UI and/or behavior of the application). Thus, the training process for the model can be utilized to adjust the model and bring it more into alignment with what the user desires.

Figure 4:
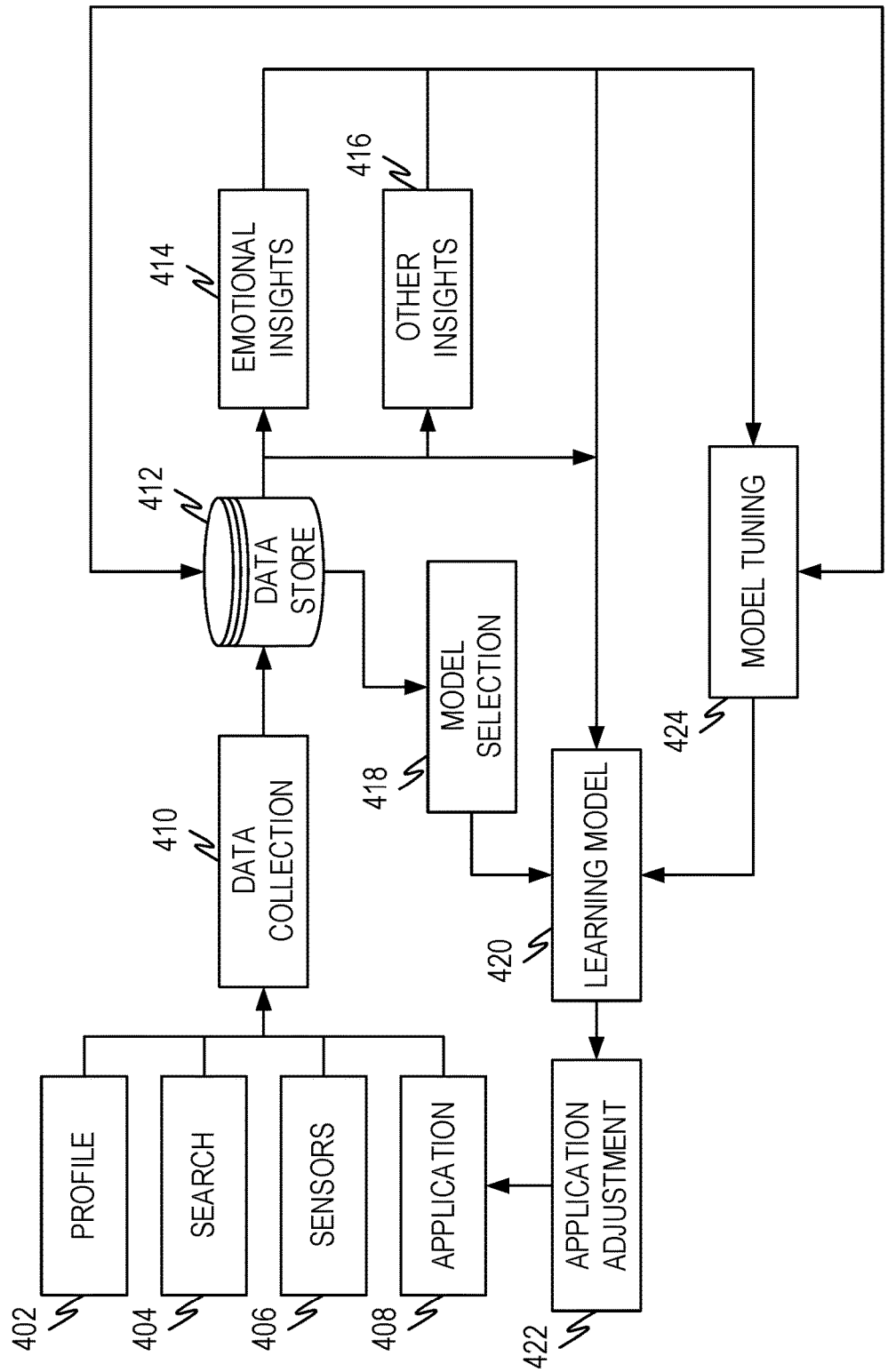
FIG. 4 illustrates an example architecture for dynamic adaptation of an application through a customized learning model according to aspects of the present disclosure.

FIG. 4 illustrates an example architecture 400 for dynamic adaptation of an application through a customized learning model according to aspects of the present disclosure. This architecture 400 has several areas of commonality with the architecture of FIG. 3. The similar aspects between FIG. 4 and FIG. 3 can operate in the same/similar fashion as described in FIG. 3. However, the architecture 400 of FIG. 4 focuses more on the insights that are derived from the collected data and how that can be used by the learning model to dynamically adjust the UI and/or behavior of the application 408.

In the embodiment of FIG. 4, the system collects data such as profile data 402, search data 404, sensor data 406, and/or application 408 data. The data can be the same as that described above in conjunction with the embodiment of FIG. 3.

Profile information 402 can comprise any information provided by a user. This can include some more traditional profile information such as name, occupation, contact information and so forth. This information can also include information directed specifically to the learning model and learning algorithms. For example, the system can provide the user notice of the learning algorithm and ability to modify the UI and/or behavior of an application and get the user's consent to utilize the user's information to provide the learning experience. As another example, the system can ask for parameters such as which learning style the user would prefer to have (visual, aural, verbal, physical, and so forth). The system can also allow the user to turn on and off various features or aspects, such as providing certain types of user overlays, set how often the system inserts itself, set thresholds for parameters such as when the learning system will make adjustments, provide information, and so forth. The system may allow the user to self-specify the level of proficiency in a particular environment and numerous other similar parameters that are used to tune how the learning system and learning algorithm behaves toward the user.

Search history and other similar data 404 can provide information about user interests, habits, and other information that can be useful to the learning model to make adjustments about how things are presented, the metaphors utilized to present information and so forth. Examples below show how this information is used in some embodiments.

Sensor data 406 includes information about the user and/or user's environment. For example, biometric data such as heart rate, respiratory rate, blood pressure, eye tracking, sentence speed, word choice, force with which keys are struck and/or touch gestures received, input timing, and other such information can provide information about the user's emotional state. Environmental sensors such as sound, temperature, lighting and so forth can provide information about the user's emotional state as well as the environment of a user (e.g., whether the user can focus on system interactions, has some level of distraction due to conversations with another individual, and so forth).

Application 408 data can provide information about how a user is interacting with the application. Thus, information such as hit rate of the application (how often the user utilizes the application), churn rate (how much of the UI in the application is touched/utilized and the time between touches/utilization), time on task, how often help is searched, and other such data provides information about familiarity with the application, familiarity with how to accomplish a task in/using the application, the user's emotional state, and so forth.

All this data can be made available to the system via one or more data stores 412. The data can be placed on the one or more data stores 412 either by a data collector 410 or by accessing the data in underlying data stores associated with the individual data (402, 404, 406, 408) or a combination thereof.

Model selection process 418 can operate in the same way as described above in conjunction with model process 318 and the details need not be repeated here. In summary, a subset (i.e., some or all) of the data collected is used to select a learning model that is a closest match for the user.

The learning model 420 can utilize a subset the collected data and/or insights derived from a subset of the collected data to customize or tune the learning model to the user as described herein. This customization can include an initial customization (i.e., as the learning model is selected and utilized for the user) as well as ongoing customization based on collected data and/or insights as described herein.

The learning model 420 derives a learning threshold as previously described and uses the threshold model to adjust the UI and/or behavior of the application 408. Such adjustment can occur from an adjustment process 422 or the learning model can directly adjust the application 408. In the instance where the system renders layers of a user interface and/or performs translation of user input/interactions or otherwise acts as an intermediary between the user and the application, application adjust process 422 can also provide this functionality. Thus, the adjustment process 422 represents the mechanism by which the adjustments to the UI and/or behavior are achieved. As described herein, this can include making adjustments directly to the application 408 if the application is learning model aware or otherwise exposes functionality to implement the identified adjustments. If the application 408 is not learning model aware or if the application 408 does not expose the appropriate functionality, the adjustments are made via rendering one or more layers in the UI and/or by performing translations between user interactions on the layered UI and interactions the application 408 as described in this disclosure.

As a user interacts with the application 408, data is collected and the information can be used to dynamically tune the learning model, which can result in further adjustments to the application 408 UI and/or behavior. This tuning is performed by model tuning process 424. Model tuning can be based on any combination of collected data, based on emotional insights 414 derived from collected data, based on other insights 416 derived from collected data, or any combination thereof. The following are representative examples that illustrate different aspects of embodiments that perform this tuning.

As mentioned above, by monitoring user interaction with the application, the user's emotional state, other derived insights, and/or any combination thereof, the model tuning process 424 can determine how successful the learning models is being in delivering the user experience desired by the user. Using the GPS example above, if the system detects rising agitation in the user because the GPS is either being too helpful or not helpful enough, the model tuning process 424 can adjust the learning model so that the learning threshold increases or decreases appropriately. The user's emotional state is derived from collected data by the emotional insight process 414. Suitable methods for use as the emotional insight process 414 to derive a user's emotional state are disclosed in U.S. patent application Ser. No. 15/291,305 entitled "Extracting an Emotional State from Device Data," filed 12 Oct. 2016, which is incorporated herein by reference in its entirety.

The other insights process 416 derives other insights based on the collected data. The other insights process 416 can include a machine learning model created using a machine learning process to derive desired insights from collected data or multiple machine learning models created using multiple machine learning processes, each designed to derive one or more desired insights from collected data. Such insights can include, for example, how successful the current learning cues and other adjustments are. For example, as described above, collected data can include information such as hit rate of the application (how often the user utilizes the application), churn rate (how much of the UI in the application is touched/utilized and the time between touches/utilization), time on task, how often help is searched, and other such data provides information about familiarity with the application, familiarity with how to accomplish a task in/using the application, and so forth. This information can be utilized with a machine learning model to identify whether the UI and/or behavior adjustments are helping the user in the desired manner, deriving a familiarity level for the user for the application, the task the user is performing, and so forth. These insights can help the model tuning process 424 tune the learning model 420.

As a representative example, suppose the user is quite familiar with a prior version of the application 408 and using the prior version of the application 408 to perform a task. The system knows this from prior engagement with the user. Then, as described in conjunction with FIG. 1, a new version of the application 408 was released and the user is now attempting to perform the task using the new version of the application.

The system identifies that the user is likely to be open to help in adjusting to the new version of the application based on the user's emotional state, or other information such as an indication by the user that she would like help. Thus, the learning model 420 is selected based on the user being open to help, the user's emotional state, a derived familiarity level (e.g., derived by other insights process 416) with the new version of the application 408, and/or other data and/or insights.

The learning model 420 sets an appropriate learning threshold to render learning cues on top of the UI of the new version of the application 408. The system then monitors the user's interactions and, based on the emotional state, hit rate, churn rate, time on task, help searches, and/or other derived insights identifies that the existing learning cues are indeed helping the user in the expected way.

As the system continues to monitor the user interaction, collected data, and/or derived insights, the learning model 420 determines that it is likely that the user no longer needs a subset of the learning cues and that the user's familiarity with the new version of the application 408 has increased. The learning model 420 changes the learning threshold in a manner that allows removal of the particular learning cues no longer needed by the user.

The system continues to monitor the user and the user's interactions. Based on rising frustration the learning model 420 determines that the user is struggling with a task now that the learning cues have been removed. Thus, the learning model 420 again adjusts the learning threshold to add the learning cues back to the interface.

In this way, the learning model dynamically and seamlessly adjusts the UI and/or behavior of the application 408 in order to help the user not only learn the new version of the application 408 but also to help the user accomplish desired tasks.

When the learning model adjusts the learning threshold but the resultant adjustment doesn't match the user's desire, the learning model does not match the user's needs and/or desires. In that instance, the model tuning process 424 will recognize that the model is not adjusting things to the user's satisfaction and tune the model so that it better matches the user's expectations and desires. For example, in the prior example, if the model changes the learning threshold, and the model tuning process 424 determines that the user's emotional state is still frustrated, the model tuning process 424 can evaluate the model and make adjustments.

Figure 5:
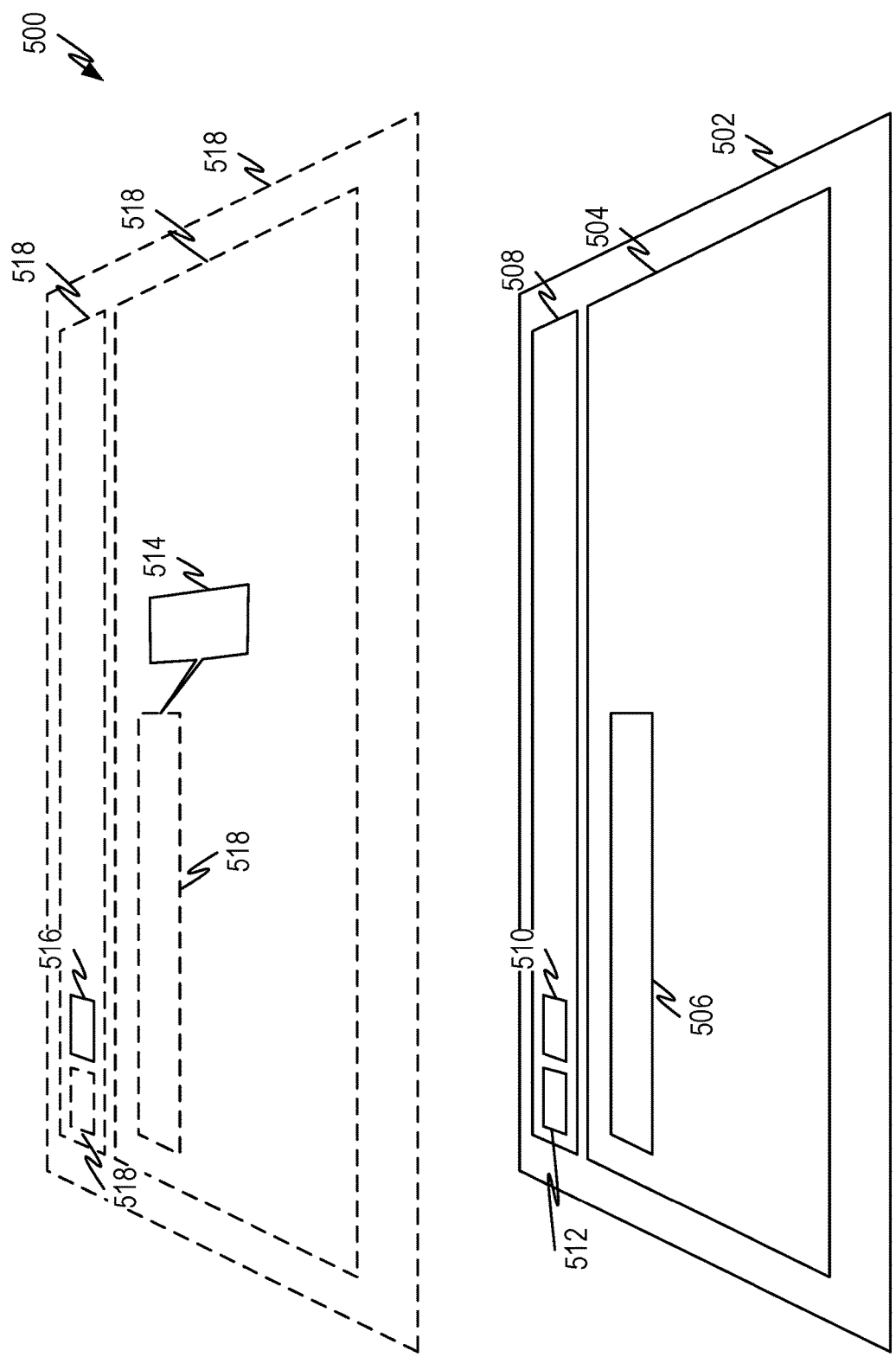
FIG. 5 illustrates a representative layered user interface.

FIG. 5 illustrates a representative layered user interface 500. This diagram represents how, for example, the application adjustment process (322, 422) can render learning cues, and so forth as part of the UI adjustments. In this example, the application UI has a window/viewport 502 and one or more areas rendered inside the window 502. In this example, there is a header or control area 508 and an area 504 where content can be rendered. The control area 508 has one or more controls 510, 512 and the content area 504 has content 506. This UI can be created using one or more layers. In this example, the UI is shown as a single layer.

The system can render learning cues and other UI elements on one or more overlay layer(s). These layer(s) will be referred to as the overlay layer although multiple layers may be involved. The dashed areas 518 illustrates the underlying UI layers and are not necessarily re-rendered by the system.

The overlay layer can contain learning cues and other information that are rendered as overlaid on the underlying UI. Learning cues can work in conjunction with the underlying UI and, for example, provide additional information. These can include callouts, help text, notes, and so forth that can be associated with the underlying UI element and can be rendered in proximity to the underlying UI element or otherwise associated with the underlying UI element. As a representative example, the overlay layer has an information element 514 associated underlying UI (content) element 506. When the two are rendered together, the information element 514 is connected to or associated with the underlying content element 506.

As described previously, in some instances the underlying UI elements can be "replaced" by overlaid UI elements. In such an instance, the overlaid UI element may obscure the underlying element so that as viewed by the user, the overlaid element is part of the UI and the underlying element cannot be seen. Additionally, or alternatively, as the user interacts with the overlaid UI element, the system can intercept the interaction and make any adjustments needed and then pass the interaction to the application as if the interaction came from the underlying UI element(s). Those of skill in the art can make the mapping and know how to make the interception, as discussed above. As previously described, the mapping and/or interception can be useful in a scenario where the system adjusts the UI and/or behavior to mimic a prior version of an application or otherwise changes the operation of the application. Thus, in FIG. 5, UI element 516 overlays and effectively replaces the underlying UI element 510.

Example Machine Architecture and Machine-Readable Medium

Figure 6:
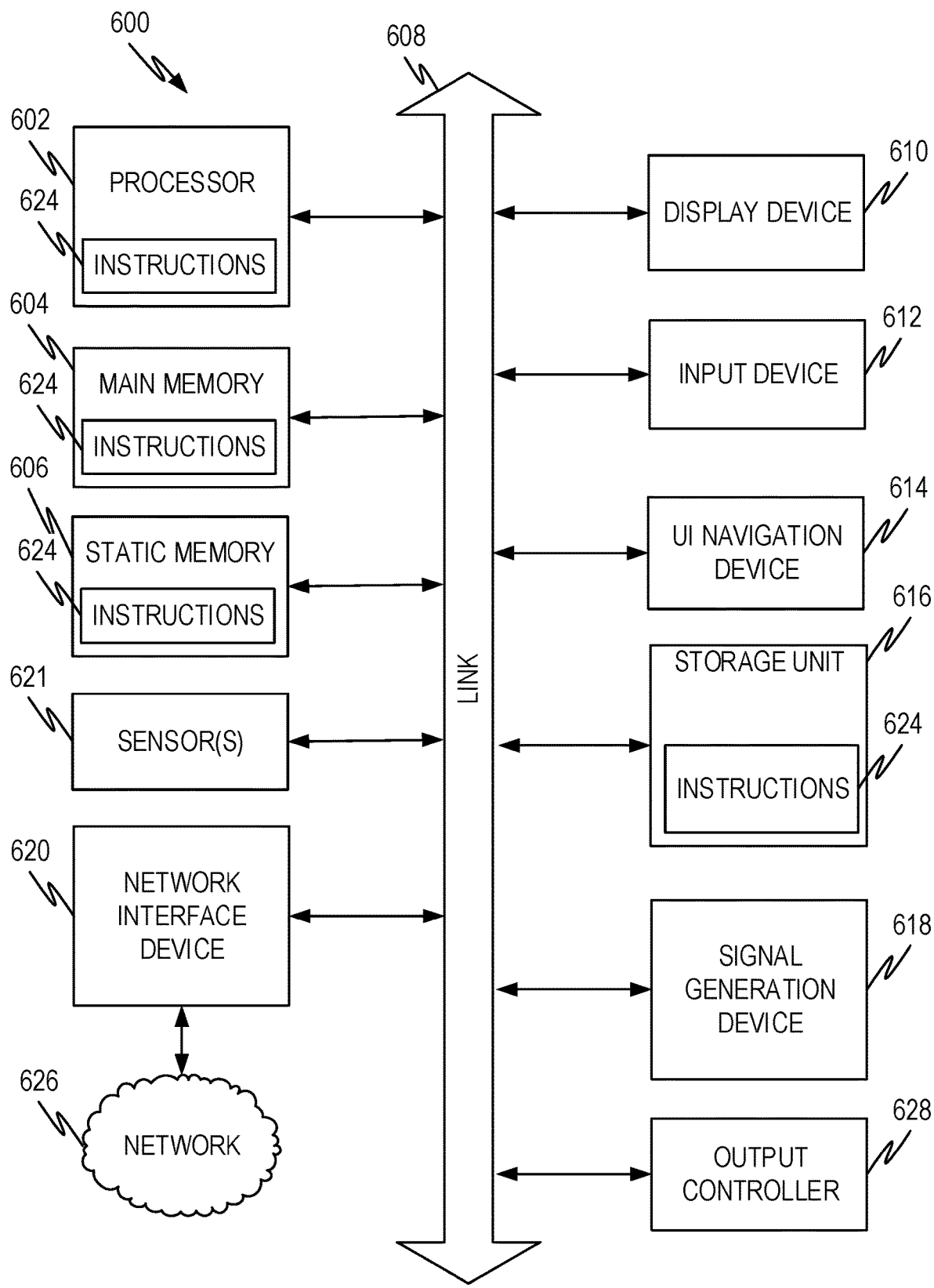
FIG. 6 illustrates a representative machine architecture suitable for implementing the systems and other aspects disclosed herein or for executing the methods disclosed herein.

FIG. 6 illustrates a representative machine architecture suitable for implementing the systems and so forth or for executing the methods disclosed herein. The machine of FIG. 6 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 6 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 600 includes at least one processor 602 (e.g., a central processing unit (CPU), a graphics processing unit (GPU), advanced processing unit (APU), etc., and/or combinations thereof), one or more memories such as a main memory 604, a static memory 606, or other types of memory, which communicate with each other via link 608. Link 608 may be a bus or other type of connection channel. The machine 600 may include further optional aspects such as a graphics display unit 610 comprising any type of display. The machine 600 may also include other optional aspects such as an alphanumeric input device 612 (e.g., a keyboard, touch screen, and so forth), a user interface (UI) navigation device 614 (e.g., a mouse, trackball, touch device, and so forth), a storage unit 616 (e.g., disk drive or other storage device(s)), a signal generation device 618 (e.g., a speaker), sensor(s) 621 (e.g., global positioning sensor, accelerometer(s), microphone(s), camera(s), and so forth), output controller 628 (e.g., wired or wireless connection to connect and/or communicate with one or more other devices such as a universal serial bus (USB), near field communication (NFC), infrared (IR), serial/parallel bus, etc.), and a network interface device 620 (e.g., wired and/or wireless) to connect to and/or communicate over one or more networks 626.

As a further representative example, consider an individual, Jeromy, who is in the middle of the autism spectrum but leans toward the low functioning end. His autistic characteristics include:

Odd behaviors, rituals and gestures that are apparent to others;

Angers easily or shows aggression due to daily routine changes in any way;

Has a fixation with the movie Kung Fu Panda produced by DreamWorks Animation;

Unable to remember the names of people or things; and

Has difficulty in a classroom learning environment.

Bill and Kathy are getting ready to go to work. Bill works full-time at a software development company and Kathy works part-time as a substitute teacher for the local school district. On the days that they are both working, their son Jeromy, who has autism, attends a special needs center. This particular morning while getting Jeromy ready to go they noticed that he was a bit agitated and difficult, more than his usual self. They sensed that today could be a difficult day for Jeromy.

The school where Jeromy has a virtual or augmented reality system (hereafter AR system) that is learning model aware and the learning model system, as described herein, executes on a combination of server and the AR system.

Jeromy and the class are in the middle of a lesson on the importance of sharing. However, the other children in the class have been extremely boisterous, which has interrupted Jeromy's regular learning routine. Jeromy does not respond well and displays a strong physical reaction (aggression, self-injurious behavior, etc.), triggering an episode.

Jeromy's smart watch sends data including hear rate and arm movement to the system learning system. Sensors in the environment measure ambient noise level and also send that data to the learning system. The system extracts an emotional state model for Jeromy, as previously described. The resultant emotional state vector indicates that Jeromy is undergoing a negative episode and includes context data regarding the ambient sound level. The emotional state, data and so forth can also be shared with the teachers, such as over the network.

The caregivers/teachers recognize Jeromy's pattern of behavior and can utilize the learning system to mitigate Jeromy's behavior. The system knows, based on Jeromy's profile, that he is a visual learner. Jeromy's parents have also authorized use of Jeromy's viewing habits and the system therefore knows of Jeromy's liking for Kung Fu Panda. Based on Jeromy's visual learning style, the collected data, the derived emotional state, and other such information, the system selects the appropriate learning model. The teachers start an application designed to both de-escalate Jeromy's behavior and deliver the lesson on sharing. Based on Jeromy's liking for Kung Fu Panda, the system sets a learning threshold that customizes the application to utilize characters from Kung Fu Panda to deliver the lesson.

The application, through the AR system, presents Jeromy with an augmented representation of a character from the Kung Fu Panda movie to focus his attention off of the surrounding activities and onto the lesson being delivered. The lesson continues utilizing the customizations to deliver the concept of sharing in the experience through a subtle and gradual interaction such that Jeromy may be unaware that he is even being taught. The learning algorithm adjusts the UI and/or behavior of the application based on Jeromy's reactions and responses during the lesson.

Executable Instructions and Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude media that consist of carrier waves, modulated data signals, and other such media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A method for modifying the user interface or behavior of an application, comprising:

selecting a learning model created by a machine learning algorithm, selected learning model matching a set of characteristics of a user; (318, 320, 418, 420)

deriving a learning threshold using the learning model (320, 420) based on a set of data (312, 412), the learning threshold setting a level of learning cues to be included in an application;

changing a user interface, a behavior or both of the application based on the learning threshold in order to incorporate learning cues into the application; (322, 422)

monitoring the user's interaction with the application; (310, 410) and based on the user's interaction, changing the learning threshold using the learning model (322, 422).

Example 2

The method of example 1 wherein the learning model matches a learning style of the user and wherein the changes made to the user interface, the behavior or both account for the learning style of the user.

Example 3

The method of example 1 wherein the changes made to the user interface are rendered in a separate layer of the user interface.

Example 4

The method of example 1, 2, or 3 wherein the changes made to the user interface comprise at least one of:
a learning cue rendered to overlay an underlying user interface; and
a user interface element that obscures an underlying user interface element.

Example 5

The method of example 1 further comprising:
deriving an emotional state for the user; and
wherein adjusting the learning threshold accounts for the emotional state of the user.

Example 6

The method of example 1 wherein the set of data comprise one or more of:
user profile data;
search history data;
sensor data that indicates a characteristic of the user, an environment of the user, the device, or any combination thereof;
application data comprising one or more of: hit rate of the application, churn rate, time on task, and how often help is searched; and
an emotional state of the user.

Example 7

The method of example 1 wherein the application is a GPS application and the learning threshold is adjusted based on the user's familiarity with an area surrounding a current location of the GPS application.

Example 8

The method of example 7 wherein the learning threshold sets at least one of:
a level of detail associated with directions given to the user;
frequency of directions given to the user; and
a type of direction given to the user.

Example 9

The method of example 1 further comprising customizing the learning model based on user information.

Example 10

A system for setting a learning level associated with an application comprising:
selecting a learning model created by a machine learning algorithm, selected learning model matching a set of characteristics of a user; (318, 320, 418, 420)
deriving a learning threshold using the learning model (320, 420) based on a set of data (312, 412), the learning threshold setting a level of learning cues to be included in an application;
changing a user interface, a behavior or both of the application based on the learning threshold in order to incorporate learning cues into the application; (322, 422)
monitoring the user's interaction with the application; (310, 410) and
based on the user's interaction, changing the learning threshold using the learning model (322, 422).

Example 11

The system of example 10 wherein the learning model matches a learning style of the user and wherein the changes made to the user interface, the behavior or both account for the learning style of the user.

Example 12

The system of example 10 wherein the changes made to the user interface are rendered in a separate layer of the user interface.

Example 13

The system of example 10 wherein the changes made to the user interface comprise at least one of:
a learning cue rendered to overlay an underlying user interface; and
a user interface element that obscures an underlying user interface element.

Example 14

The system of example 10 further comprising:
deriving an emotional state for the user; and
wherein adjusting the learning threshold accounts for the emotional state of the user.

Example 15

The system of example 10 wherein the set of data comprise one or more of:
user profile data;
search history data;
sensor data that indicates a characteristic of the user, an environment of the user, the device, or any combination thereof;
application data comprising one or more of: hit rate of the application, churn rate, time on task, and how often help is searched; and
an emotional state of the user.

Example 16

The system of example 10 wherein the application is a GPS application and the learning threshold is adjusted based on the user's familiarity with an area surrounding a current location of the GPS application.

Example 17

The system of example 16 wherein the learning threshold sets at least one of:

a level of detail associated with directions given to the user;
frequency of directions given to the user; and
a type of direction given to the user.

Example 18

The system of example 10, 11, 12, 13, 14, 15, 16, or 17 further comprising customizing the learning model based on user information.

Example 19

A computer storage medium comprising executable instructions that, when executed by a processor of a machine, cause the machine to perform operations comprising:
selecting a learning model created by a machine learning algorithm, selected learning model matching a set of characteristics of a user; (318, 320, 418, 420)
deriving a learning threshold using the learning model (320, 420) based on a set of data (312, 412), the learning threshold setting a level of learning cues to be included in an application;
changing a user interface, a behavior or both of the application based on the learning threshold in order to incorporate learning cues into the application; (322, 422)
monitoring the user's interaction with the application; (310, 410) and
based on the user's interaction, changing the learning threshold using the learning model (322, 422).

Example 20

The medium of example 19 further comprising tuning the learning model based on the user's interaction and based on interaction of a plurality of other users.

Example 21

A method for modifying the user interface or behavior of an application, comprising:
selecting a learning model created by a machine learning algorithm, selected learning model matching a set of characteristics of a user; (318, 320, 418, 420)
deriving a learning threshold using the learning model (320, 420) based on a set of data (312, 412), the learning threshold setting a level of learning cues to be included in an application;
changing a user interface, a behavior or both of the application based on the learning threshold in order to incorporate learning cues into the application; (322, 422)
monitoring the user's interaction with the application; (310, 410) and
based on the user's interaction, changing the learning threshold using the learning model (322, 422).

Example 22

The method of example 21 wherein the learning model matches a learning style of the user and wherein the changes made to the user interface, the behavior or both account for the learning style of the user.

Example 23

The method of example 22 wherein the learning style of the user comprises one or more of:
visual/spatial;
aural/auditory;
verbal/linguistic;
physical/kinesthetic;
logical/mathematical;
social/interpersonal; and
solitary/intrapersonal.

Example 24

The method of example 21, 22, or 23 wherein the changes made to the user interface are rendered in a separate layer of the user interface.

Example 25

The method of example 21, 22, 23, or 24 wherein the changes made to the user interface comprise at least one of:
a learning cue rendered to overlay an underlying user interface; and
a user interface element that obscures an underlying user interface element.

Example 26

The method of example 21, 22, 23, 24, or 25 further comprising:
deriving an emotional state for the user; and
wherein adjusting the learning threshold accounts for the emotional state of the user.

Example 27

The method of example 21, 22, 23, 24, 25, or 26 wherein the set of data comprise one or more of:
user profile data;
search history data;
sensor data that indicates a characteristic of the user, an environment of the user, the device, or any combination thereof;
application data comprising one or more of: hit rate of the application, churn rate, time on task, and how often help is searched; and
an emotional state of the user.

Example 28

The method of example 21, 22, 23, 24, 25, 26, or 27 wherein the application is a GPS application and the learning threshold is adjusted based on the user's familiarity with an area surrounding a current location of the GPS application.

Example 29

The method of example 28 wherein the learning threshold sets at least one of:
a level of detail associated with directions given to the user;
frequency of directions given to the user; and
a type of direction given to the user.

Example 30

The method of example 21, 22, 23, 24, 25, 26, 27, 28, or 29 further comprising customizing the learning model based on user information.

Example 31

The method of example 21, 22, 23, 24, 25, 26, 27, 28, 29, or 30 further comprising tuning the learning model based on the user's interaction and based on interaction of a plurality of other users.

Example 32

The method of example 21, 22, 23, 24, 25, 26, 27, 28, 29, 30, or 31 wherein the learning threshold is based on whether environmental sensors detect that the user is interacting with another individual.

Example 33

The method of example 21, 22, 23, 24, 25, 26, 27, 28, 29, 30, 31, or 32 wherein the learning threshold is based on a distraction level of the user.

Example 34

An apparatus comprising means to perform a method as in any preceding example.

Example 35

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for modifying a GPS application, comprising:
    selecting a learning model created by a machine learning algorithm, selected learning model matching a set of characteristics of a user;
    deriving a learning threshold using the learning model based on the user's familiarity with an area surrounding a current location of the GPS application, the learning threshold setting a level of learning cues to be included in the GPS application, the level of learning cues comprising:
        a level of detail associated with directions given to the user;
        a frequency of directions given to the user; and
        a type of direction given to the user;
    changing a user interface, a behavior or both of the GPS application based on the learning threshold in order to incorporate learning cues into the GPS application;
    monitoring the user's interaction with the application; and
    based on the user's interaction, changing the learning threshold using the learning model.

2. The method of claim 1 wherein the learning model matches a learning style of the user and wherein the changes made to the user interface, the behavior or both account for the learning style of the user.

3. The method of claim 1 wherein the changes made to the user interface are rendered in a separate layer of the user interface.

4. The method of claim 1 wherein the changes made to the user interface comprise at least one of:
    a learning cue rendered to overlay an underlying user interface; and
    a user interface element that obscures an underlying user interface element.

5. The method of claim 1 further comprising:
    deriving an emotional state for the user; and
    wherein changing the learning threshold accounts for the emotional state of the user.

6. The method of claim 1 wherein the learning threshold is further derived based on one or more of:
    user profile data;
    search history data;
    sensor data that indicates a characteristic of the user, an environment of the user, a device, or any combination thereof;
    application data comprising one or more of: hit rate of the application, churn rate, time on task, and how often help is searched; and
    an emotional state of the user.

7. The method of claim 1 further comprising customizing the learning model based on one or more other user's information.

8. A system for setting a learning level associated with a GPS application comprising:
    selecting a learning model created by a machine learning algorithm, the selected learning model matching a set of characteristics of a user;
    deriving a learning threshold using the learning model based on the user's familiarity with an area surrounding a current location of the GPS application, the learning threshold setting a level of learning cues to be included in the GPS application, the level of learning cues comprising:
        a level of detail associated with directions given to the user;
        a frequency of directions given to the user; and
        a type of direction given to the user;
    changing a user interface, a behavior or both of the GPS application based on the learning threshold in order to incorporate learning cues into the GPS application;
    monitoring the user's interaction with the application; and
    based on the user's interaction, changing the learning threshold using the learning model.

9. The system of claim 8 wherein the learning model matches a learning style of the user and wherein the changes made to the user interface, the behavior or both account for the learning style of the user.

10. The system of claim 8 wherein the changes made to the user interface are rendered in a separate layer of the user interface.

11. The system of claim 8 wherein the changes made to the user interface comprise at least one of:
    a learning cue rendered to overlay an underlying user interface; and
    a user interface element that obscures an underlying user interface element.

12. The system of claim 8 further comprising:
    deriving an emotional state for the user; and
    wherein adjusting the learning threshold accounts for the emotional state of the user.

13. The system of claim 8 wherein learning threshold is further derived based on one or more of:

user profile data;

search history data;

sensor data that indicates a characteristic of the user, an environment of the user, a device, or any combination thereof;

application data comprising one or more of: hit rate of the application, churn rate, time on task, and how often help is searched; and an emotional state of the user.

14. The system of claim 8 further comprising customizing the learning model based on one or more other user's information.

15. A computer storage medium comprising executable instructions that, when executed by a processor of a machine, cause the machine to perform operations comprising:

selecting a learning model created by a machine learning algorithm, the selected learning model matching a set of characteristics of a user;

deriving a learning threshold using the learning model based on the user's familiarity with an area surrounding a current location of a GPS application, the learning threshold setting a level of learning cues to be included in the GPS application, the level of learning cues comprising:

a level of detail associated with directions given to the user;

a frequency of directions given to the user; and a type of direction given to the user;

changing a user interface, a behavior or both of the GPS application based on the learning threshold in order to incorporate learning cues into the GPS application;

monitoring the user's interaction with the application; and based on the user's interaction, changing the learning threshold using the learning model.

16. The medium of claim 15 further comprising tuning the learning model based on the user's interaction and based on interaction of a plurality of other users.

* * * * *